Sept. 14, 1954   J. T. SABOL   2,689,296
MEANS AND METHOD OF HIGH-FREQUENCY INDUCTION HEATING
Filed June 9, 1949

INVENTOR.
JOHN T. SABOL
BY
*Alfred C. Body*
ATTORNEY

Patented Sept. 14, 1954

2,689,296

UNITED STATES PATENT OFFICE 2,689,296

MEANS AND METHOD OF HIGH-FREQUENCY INDUCTION HEATING

John T. Sabol, Cleveland, Ohio, assignor to The Ohio Crankshaft Company, Cleveland, Ohio, a corporation of Ohio Application June 9, 1949, Serial No. 98,108

15 Claims. (Cl. 219—10.79)

1

This invention pertains to the art of high-frequency induction heating and, more particularly, to an inductor construction and arrangement for progressively heating a generally elongated metallic workpiece.

The invention is particularly adapted to, although not limited to, the elimination of the so-called "fish-tail" or "gap" effect in high-frequency induction heating.

In the art of high-frequency induction heating, a one-turn conductor is usually employed defining an opening through which a workpiece is moved progressively from one end to the other. High-frequency electric currents flow in the conductor around the opening and induce currents in the workpiece which heat a narrow band along the surface of the workpiece. The ends of the conductor generally are in close-spaced insulated relationship and fish-tail leads connect to the ends to provide the connectors of the electric current to the conductor. The space between the ends is often called the split. The electric current in the conductor creates a high-frequency magnetic field which threads through the workpiece opening and induces oppositely-flowing currents in that portion of the workpiece within the opening.

Such induced heating of the workpiece has proved particularly satisfactory in the commercial field with one exception. Generally, a dead spot occurs in the induced heating directly opposite the split wherein little or no heating of the workpiece actually occurs. The change in direction of the electric current in the immediate vicinity of the split so distorts the flux field that no heating is obtained.

Many efforts have been made in the past to overcome the dead-spot effect. The shape of the opening itself has been varied with increased spacing between the surfaces of the workpiece and the surfaces of the opening remote from the split. Such an arrangement decreases the electrical coupling of the inductor to the workpiece and does not produce the desired result. It has also been proposed to have the split extend on a diagonal; that is, the ends of the conductor overlap at the split. Experiments have shown that this is not satisfactory.

The alternative has been to continuously rotate the workpiece as it passes through the opening. Rotating the workpiece increases the complexity of the equipment, particularly where articles of large size or length must be handled. Also, where workpieces having a cross-sectional shape other than circular are to be heated, these shapes

2 could not be rotated in any way except to make the inductor opening sufficiently large enough to permit this rotation. Here, the electrical coupling of the inductor to the workpiece is quite poor, resulting in low heating efficiencies.

The present invention contemplates a method of heating and an inductor construction or arrangement which overcomes all of the above difficulties in a simple manner and eliminates the dead-spot effect without rotation of the workpiece as it is progressed through the inductor.

The principal object of the invention is the provision of a new and improved method of progressively heating a workpiece wherein the workpiece need not be rotated to eliminate the dead-spot effect which comprises preheating that portion of the workpiece which will pass opposite the split of the inductor and then heating the remaining periphery of the workpiece.

Another principal object of the invention is the provision of a new and improved high-frequency inductor which comprises, in combination, a principal inductor having a workpiece-adjacent surface opening past which a workpiece is adapted to be progressively moved and heated, the inductor having a split at one point of its periphery and a second inductor disposed close to the principal inductor and symmetrical relative to the split.

Another object of the invention is a new and improved inductor adapted to progressively heat an elongated workpiece, including a conductor adapted to be disposed in heat-inducing relationship to the workpiece and a pair of fish-tail leads adapted to connect to a power source, one of the fish-tail leads extending at least for a short distance in such a manner as to be in close coupled relationship to the workpiece and the other fish-tail lead extending so as to be out of coupled relationship with the workpiece and the other lead at least for a short distance.

Generally, the method of the present invention comprises heating that narrow portion of the periphery of a workpiece progressing through a high-frequency inductor which will normally progress past the split of the inductor and then heating the remainder of the periphery. The heating of the narrow portion may be done by inducing high-frequency currents to flow in that portion at an angle relative to the currents of the inductor.

The apparatus of the present invention may comprise the combination of a principal and auxiliary inductor for progressively heating an elongated workpiece, the auxiliary inductor being adapted to be disposed opposite the portion of the workpiece which will progress past the split of the principal inductor. The auxiliary inductor may be formed as a single conductor extending longitudinally of the workpiece, as a loop or some other means for threading high-frequency flux into the surface of the workpiece at the proper place. The auxiliary inductor may be separately energized from the principal inductor, or in electrical series or parallel relationship therewith.

In the preferred embodiment, the auxiliary inductors are portions of the fish-tail leads, one of the fish-tail leads extending for a short distance from the split in close-coupled relationship to the workpiece and in overlapping, symmetrical relationship to the split, the other fish-tail lead extending for a short distance in uncoupled-spaced relationship to the workpiece and to the other lead.

The invention is embodied in certain parts and arrangement of parts and in certain methods and steps, preferred embodiments of which are described in this specification and illustrated in the attached drawing which is a part hereof, and wherein.

Figure 1:
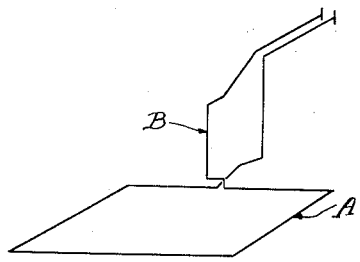
Figure 1 is a schematic view in perspective of a preferred arrangement of a high-frequency inductor embodying the present invention.

Referring now to the drawings wherein preferred embodiments of the invention are shown for the purposes of illustration only and not for the purpose of limitation, Figures 1 to 4 show a high-frequency inductor particularly adapted for external induction heating, including a primary inductor A and an auxiliary inductor B in operative relationship with a workpiece C which is being progressively moved in a vertically downward direction relative to the two inductors and in close electrically-coupled relationship thereto. The workpiece C, here shown, is rectangular in cross section and so arranged relative to the inductor that it cannot be rotated relative thereto. Any other shape of workpiece may be employed. The workpiece is axially long relative to the inductor A and is moved axially downwardly thereto to effect a progressive heating of the entire surface.

The primary inductor A is conventional in structure and forms no part of the present invention, except insofar as it is in combination with and operates in conjunction with the auxiliary inductor B.

The primary inductor A shown comprises a copper conductor 11 arranged in the form of a rectangular loop with the inner or facing side walls 12 defining a rectangular workpiece-receiving opening 13 slightly larger than the cross-sectional dimensions of the workpiece C. The upper portion of the side walls 12 are generally straight and parallel to each other and the axis of movement of the workpiece. The lower portion of the side walls diverges outwardly at an angle of approximately thirty degrees. The portion of the conductor in the plane of the upper portion of the side walls is the inductor proper. The lower portion serves primarily as a quenching means integral with the inductor A for quenching the heated workpiece as it progresses downwardly through the opening 13. Thus, the diverging side walls are provided with a plurality of openings 14 communicating with a passage 15 in the interior portion of the conductor, which passage 15 is supplied with water or other quenching medium under pressure. This quenching medium is ejected through the holes 14 onto the heated surface of the workpiece, rapidly cooling it, producing the desired hardened layer. The conductor 11 may also be provided with a second passage 17 through which cooling water may be circulated for the purpose of removing heat generated therein as a result of the high electrical currents flowing.

The ends of the conductor 11 are in close-spaced aligned relationship forming a split 20. High-frequency electric currents are circulated into the loop at one side of the split around the periphery of the loop and out adjacent the other side of the split 20. These high-frequency currents produce a high-frequency magnetic field which threads through the workpiece C and induces high-frequency currents therein, which currents rapidly heat the workpiece C as it is progressed through the opening in a downward direction.

The principle of the inductor A is described in greater detail and claimed in the copending application of James B. Wadhams, Serial No. 651,243, filed March 1, 1946, now abandoned.

An inductor of the type described produces an even heating effect around the entire periphery of the workpiece C with a single exception; that is, the portion of the workpiece passing directly opposite to the split 20 is heated to a substantially lesser degree than that of the remainder of the workpiece. Heretofore, the workpiece has been rotated relative to the inductor in order to eliminate this dead-spot effect. However, with the rectangular workpiece C shown, rotation thereof relative to the inductor is impossible and, heretofore, it has been considered impossible to produce an even depth of heating around such a rectangular bar without unduly enlarging the opening 13.

The present invention overcomes this dead-spot effect by providing the auxiliary inductor B on the upper or entrance side of the primary inductor A, which auxiliary inductor B preheats that portion of the workpiece which will move past the split 20 to an amount sufficient to compensate for the tendency of lack of heating opposite the split 20. If desired, the auxiliary inductor may be so designed as to preheat to a degree where an increased depth of heating will result opposite the split 20. Alternatively, other auxiliary inductors can be employed to give localized increased depths of heating anywhere around the rectangular workpiece.

The auxiliary inductor B shown comprises a short conductor 22 of copper or the like and having a workpiece-adjacent surface 21 parallel to and close spaced with the surface of the workpiece and its axis of movement. In the preferred embodiment, the workpiece-adjacent surface 21 is in the same plane as the side walls of the conductor 11 adjacent to the split 20. As shown, the conductor 22 is symmetrically arranged in a vertical plane relative to the gap 20 such that any heat induced in the workpiece is symmetrical relative to the split 20. The width of the workpiece-facing surface 21 should be made to correspond to the width of the dead spot which may be expected with the particular principal inductor A employed. The length of the conductor 22 will vary according to the total amount of heat which must be developed to overcome the gap effect. This will also be dependent to some extent on the width of the workpiece-facing surface 21. In the preferred embodiment, the length of the conductor 22 is slightly less than that required to produce the necessary heating and laminations 29 are disposed about the sides of the conductor other than the workpiece surface to increase the heating effect to the desired amount. Ready control of the amount of heating of the inductor B may thus be obtained by varying the number of laminations. Alternatively, the stack of laminations may be adjustably supported on the auxiliary inductor B.

The auxiliary inductor B may be formed separately and distinct from the primary inductor A; but, in the preferred embodiment, the auxiliary inductor B is connected electrically in series with the primary inductor A and, in the embodiment shown, actually forms part of the fish-tail leads for the primary inductor A.

Figure 3:
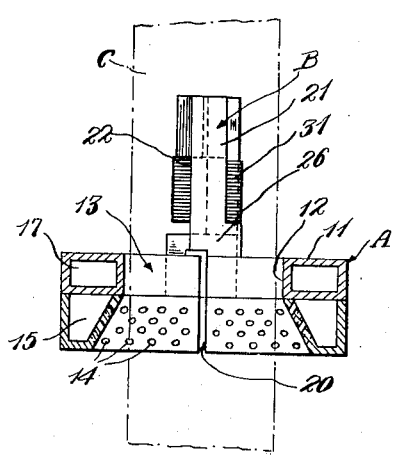
Figure 3 is a cross-sectional view of Figure 2 taken approximately on the line 3—3.
Figure 2:
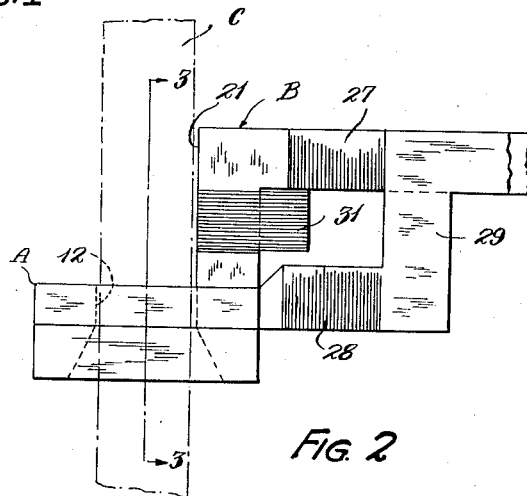
Figure 2 is a side elevational view thereof.

Thus, as viewed in Figure 3, the lower end of the auxiliary inductor B is connected to the end of the conductor 11 on the right-hand side of the split 20 by a small offset connection 26 and the upper end connects to a horizontally-extending, fish-tail lead 27.

A second fish-tail lead 28 connects to the outer edge of the inductor A adjacent the left-hand side of the split 20 and extends transversely away from the inductor for a short distance, thence upwardly as at 29 until it reaches the left of the fish-tail lead 22 from whence it then turns abruptly and extends in close-spaced, parallel relationship away from the inductor to connect to a suitable power source. With this arrangement, the two fish-tail leads 22, 23 extend away from the primary inductor A for a short distance in substantial spaced relationship whereby the proximity of the two members is not such that the currents in the auxiliary inductor A will be concentrated on the side closest to the other fish-tail lead.

Thus, as the workpiece C is progressed vertically downwardly through the opening 12, that portion of the workpiece which will eventually move past the split 20 is preheated by induced currents from the auxiliary inductor B to an amount to make up for the lack of heating opposite the split 20. In this manner, the workpiece, as it leaves the influence of the two inductors to enter the quench stream from the opening 14, is actually heated evenly throughout its entire periphery whereby a uniform-depth hardened surface may be obtained on the workpiece C.

If perchance it is desired to have portions of the workpiece remote from the split heated to amounts greater that the remainder of the workpiece, the fish-tail lead 28 could be directed away from the inductor A and around to a point opposite where the increased heating is desired and thence in parallel relationship with the other fish-tail lead 22.

Figure 5:
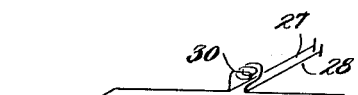
Figure 5 is a schematic view similar to Figure 1 showing an alternative arrangement.
Figure 4:
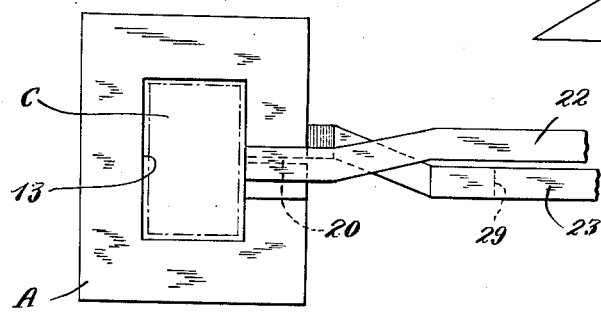
Figure 4 is a top plan view of Figure 1.

The auxiliary inductor B may take other forms than that shown; e. g., it may be in the form of a one or multiturn loop or helix or spiral with the axis perpendicular to the workpiece axis. A magnetic core could be provided. Such an arrangement is shown in Figure 5 wherein the auxiliary inductor B comprises a multiturn loop 30 connected in parallel across the fish-tail leads 27, 28 for the principal inductor A.

While the invention has been illustrated with reference to a rectangular-shaped workpiece, it is adaptable to any other shape, including circular shapes, which can be heated uniformly in the same manner as the rectangular workpiece. The prime advantage, insofar as a circular workpiece is concerned, is that a circular workpiece need not be rotated.

In some instances, the offset 26 may be eliminated and the conductor 22 arranged to extend at an angle from the upper side of the conductor 11 across the plane of the split to an equal amount more or less on the other side.

The invention has been described with reference to external heating; i. e., where the principal inductor A surrounds the workpiece. The invention is equally applicable to internal heating; i. e., where the inductors A and B are inserted in an opening or bore of a workpiece. In the latter case, the inductor and fish-tail lead would be turned inside out to that shown in the preferred embodiment.

In operation, the workpiece is positioned relative to the inductors so that the auxiliary inductor is in full coupled relationship to the workpiece and the primary inductor, either just out of coupled relationship with an end of the workpiece or just in. The inductors are energized simultaneously and the workpiece and inductors progressed relatively to the other end of the workpiece until the principal inductor has heated the end, at which time the power is turned off. The progressive movement continues until the end is fully quenched. No great change in power relationship appears to occur as the auxiliary inductor moves out of coupled relationship with the workpiece. An even hardened layer on the workpiece results.

Thus, it will be seen that embodiments of the invention have been described which accomplish the objectives of the invention heretofore set forth. It will be apparent that, at least in the art of progressive heating, an inductor has been provided wherein the effect of the gap of conventional conductors has been eliminated and that an even depth of heating may be obtained, either using internal inductors or external inductors.

It will be appreciated that modifications will occur to others upon a reading and understanding of this specification. It is my intention to cover such modifications and alterations insofar as they come within the scope of the appended claims.

Having thus described my invention, I claim:

1. In combination, a primary inductor and an auxiliary inductor, said primary inductor having a workpiece-adjacent surface past which a workpiece is adapted to be relatively moved and heated inductively, said surface having a split, said inductor normally heating the workpiece uniformly except opposite said split, said auxiliary inductor comprising a conductor having a limited peripherally-extending workpiece-facing area symmetrically positioned relative to said split only and adjacent the path of movement of said workpiece to preheat the portion only of the workpiece normally progressing past the split.

2. The combination of claim 1 wherein said conductor is in the form of a loop having an axis aligned with a plane through said split and said line of movement.

3. The combination of claim 1 wherein said conductor is in the form of an elongated member extending generally parallel to the path of movement of the workpiece and in general symmetrical relationship to the split.

4. A high-frequency inductor comprising a conductor having a workpiece-facing surface defining an opening through which a workpiece is adapted to be relatively moved from one side to the other and having ends defining a split, a pair of leads each attached to said inductor, one on each side of said split, one of said leads having a surface extending generally parallel to the axis of and in the plane of said workpiece-facing surface and generally symmetrically disposed relative to the split.

5. The combination of claim 4 wherein at least a portion of the lead extending parallel to the axis of the opening has magnetically permeable material about the surfaces other than said workpiece-facing surface.

6. The combination of claim 4 wherein the other lead extends away from the axis of the opening for a short distance and then in close-spaced relationship to said first mentioned lead.

7. The combination of claim 4 wherein the other lead extends parallel to the axis of the opening for a short distance at a point radially spaced from the split and thence in close-spaced relationship to said first mentioned lead.

8. The method of eliminating the effect of the dead spot normally opposite the split of a high-frequency inductor as a workpiece is progressed without rotation past said inductor, which comprises preheating that portion only of the workpiece which normally moves past said split and then inducing high-frequency currents to flow in said workpiece in greater amounts remote from said split than at said split, the amount of preheating being proportioned so that a uniform, peripheral heat results.

9. In the art of high-frequency induction heating, a pair of inductors adapted to be disposed in close-spaced, current-inducing relationship with a workpiece, one of said inductors having a split and a workpiece-receiving opening defined by a workpiece-facing surface elongated in one direction, said surface extending peripherally of the surface of the workpiece to be heated, the other inductor having a workpiece-facing surface narrow in said direction and parallel to the axis of the opening and generally coplanar with said surface of said first-mentioned inductor in close-spaced relationship with the surface of the workpiece, said other inductor being arranged generally symmetrically relative to the split of the first inductor.

10. The combination of claim 9 wherein said inductors are connected in electrical-series relationship.

11. A high-frequency inductor arrangement past which an elongated workpiece is adapted to be relatively advanced along a predetermined path of movement, said arrangement including a first inductor having an extended workpiece-facing surface having a principal dimension transverse to said path of movement, said surface having a split generally parallel to the path of movement, said inductor having a workpiece-approach side and a workpiece-departure side, said arrangement also including a second inductor immediately adjacent the approach side of said inductor having a workpiece-facing surface adjacent said path of movement and symmetrically arranged relative to said split and having a limited dimension in a direction transverse to the path of movement of said workpiece.

12. The combination of claim 11 wherein said second inductor is a loop having an axis perpendicular to said path of movement.

13. The combination of claim 11 wherein said second inductor is a narrow elongated conductor extending parallel to the path of movement symmetrically positioned relative to said split, said conductor having a workpiece-facing surface in closed-spaced relationship to the path of movement of the surface to be heated.

14. The combination of claim 9 wherein said second inductor is comprised of one of the fishtail leads supplying power to the principal inductor and connected to said inductor at one side of said split.

15. In combination, first and second high-frequency inductors past which an elongated workpiece is adapted to be relatively advanced along a predetermined path of movement, said first inductor having an extended workpiece-facing surface having a principal dimension transverse to said path of movement, said first inductor also having a point along its workpiece-facing surface opposite which a reduced amount of heating in the workpiece takes place, said first inductor having a workpiece-approach side and a workpiece-departure side, said second inductor being positioned on the approach side of said first inductor and having a workpiece-facing surface adjacent said path of movement and limited in dimension in a direction transverse to the path of movement of said workpiece, said second inductor being generally aligned along the path of movement with said point on said first inductor.

References Cited in the file of this patent

UNITED STATES PATENTS

| Number | Name | Date |
|---|---|---|
| 2,182,341 | Hulster | Dec. 5, 1939 |
| 2,202,758 | Denneen et al. | May 28, 1940 |
| 2,394,944 | Stanton | Feb. 12, 1946 |
| 2,477,118 | Detuno | July 26, 1949 |
| 2,493,771 | Marquardt et al. | Jan. 10, 1950 |
| 2,493,950 | Dow et al. | Jan. 10, 1950 |

FOREIGN PATENTS

| Number | Country | Date |
|---|---|---|
| 621,081 | Great Britain | Apr. 4, 1949 |

OTHER REFERENCES

Curtis, "High Frequency Induction Heating," 1944, pages 72 and 73. (Copy available in Scientific Library.)